(12) United States Patent
Eswara et al.

(10) Patent No.: US 10,637,774 B2
(45) Date of Patent: Apr. 28, 2020

(54) SECURELY LOCALIZED AND FAULT TOLERANT PROCESSING OF DATA IN A HYBRID MULTI-TENANT INTERNET OF THINGS SYSTEM

(71) Applicant: VMWARE, INC., Palo Alto, CA (US)

(72) Inventors: Vinay Doddaballapur Eswara, Bangalore (IN); Gaurav Srivastava, Bangalore (IN); Soumik Biswas, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 15/921,684

(22) Filed: Mar. 15, 2018

(65) Prior Publication Data

US 2019/0230029 A1 Jul. 25, 2019

(30) Foreign Application Priority Data

Jan. 25, 2018 (IN) .............................. 201841003090

(51) Int. Cl.
*H04L 29/08* (2006.01)
*H04L 12/753* (2013.01)

(52) U.S. Cl.
CPC .............. *H04L 45/48* (2013.01); *H04L 67/12* (2013.01); *H04L 67/10* (2013.01)

(58) Field of Classification Search
None
See application file for complete search history.

(56) References Cited

U.S. PATENT DOCUMENTS

| 10,200,504 | B2 * | 2/2019 | Decenzo ............ H04L 65/4084 |
| 2014/0359035 | A1 | 12/2014 | Wang et al. |
| 2015/0145676 | A1 | 5/2015 | Adhikari et al. |
| 2016/0380886 | A1 * | 12/2016 | Blair ....................... H04L 45/50 398/49 |
| 2017/0017907 | A1 * | 1/2017 | Narasimhan ......... G06Q 10/063 |
| 2017/0164417 | A1 * | 6/2017 | Kress .................... H04W 76/14 |
| 2017/0171204 | A1 | 6/2017 | Forood et al. |
| 2017/0346836 | A1 | 11/2017 | Holland et al. |
| 2018/0001184 | A1 | 1/2018 | Tran et al. |
| 2018/0097690 | A1 * | 4/2018 | Yocam .................. H04B 1/0003 |
| 2018/0103128 | A1 | 4/2018 | Muscariello et al. |
| 2018/0137858 | A1 | 5/2018 | Saxena et al. |

(Continued)

OTHER PUBLICATIONS

H. Tschofenig et al., Architectural Considerations in Smart Object Networking, ISSN: 2070-1721, Mar. 2015, pp. 1-24.

(Continued)

*Primary Examiner* — Edan Orgad
*Assistant Examiner* — Emmanuel K Maglo
(74) *Attorney, Agent, or Firm* — Patterson + Sheridan, LLP

(57) ABSTRACT

The disclosure provides Internet of Things (IoT) systems organized as tree hierarchies in which rule processing can occur at each level of the tree hierarchies. In the IoT system according to one embodiment, formulas are defined and centrally managed at a cloud hub that is a root of a tree hierarchy. Each formula defined at the cloud hub is further percolated down to a hub, which may be the cloud hub itself or a local hub, in the tree hierarchy that is logically closest to devices specified in the formula. Each of the cloud and local hubs in the IoT system may utilize the same core IoT platform image, providing ease of management. In addition, formulas may be defined with basic stimuli and responses, as well as with higher-order stimuli and responses that combine one or more other stimuli and responses, respectively.

18 Claims, 6 Drawing Sheets

(56) References Cited

U.S. PATENT DOCUMENTS

| | | | |
|---|---|---|---|
| 2018/0254096 | A1 | 9/2018 | Karunanithi et al. |
| 2018/0288161 | A1 | 10/2018 | Saxena et al. |
| 2018/0302440 | A1 | 10/2018 | Hu et al. |
| 2019/0014004 | A1 | 1/2019 | Horiuchi |
| 2019/0166125 | A1 | 5/2019 | Bender et al. |
| 2019/0206231 | A1* | 7/2019 | Armstrong ............ H04W 4/029 |
| 2019/0230028 | A1 | 7/2019 | Eswara et al. |
| 2019/0230030 | A1 | 7/2019 | Eswara et al. |

OTHER PUBLICATIONS

Tara Salman, Networking Protocols and Standards for Internet of Things, pp. 1-28, http://www.cse.wusti.edu/~jain/cse570-15/ftp/iot_prot/.

M. Singh et al., "Secure MQTT for Internet of Things (IoT)," in Fifth International Conference on Communication, Systems and Network Technologies (CSNT 2015), Apr. 2015, pp. 746-751, http://ieeexplore.ieee.org/xpl/articleDetails.jsp?arnumber=7280018.

Vinay Eswara et al., "Conflux: Distributed, real-time actionable insights on high-volume data streams", CMG 2016, pp. 1-9, http://www.cmgindia.org/wp-content/uploads/2016/12/Conflux-CRC.pdf.

MQTT Java Library, https://eclipse.org/paho/clients/java/.

AWS IoT, https://aws.amazon.com/iot/.

IBM Bluemix, https://www.ibm.com/cloud-computing/bluemix/.

AWS IoT Core, https://aws.amazon.com/iot-core/.

David Karger et al., Consistent Hashing and Random Trees: Distributed Caching Protocols for Relieving Hot Spots on the World Wide Web, Proceedings of the twenty-ninth annual ACM symposium on Theory of computing, p. 654-663, May 4-6, 1997, El Paso, Texas, USA.

* cited by examiner

SECURELY LOCALIZED AND FAULT TOLERANT PROCESSING OF DATA IN A HYBRID MULTI-TENANT INTERNET OF THINGS SYSTEM

RELATED APPLICATIONS

Benefit is claimed under 35 U.S.C. 119(a)-(d) to Foreign Application Serial No. 201841003090 filed in India entitled "SECURELY LOCALIZED AND FAULT TOLERANT PROCESSING OF DATA IN A HYBRID MULTI-TENANT INTERNET OF THINGS SYSTEM", on Jan. 25, 2018, by VMware, Inc., which is herein incorporated in its entirety by reference for all purposes.

The present application (U.S. patent application Ser. No. 15/921,684) is related in subject matter to U.S. patent application Ser. No. 15/921,681 and U.S. patent application Ser. No. 15/921,691, which are incorporated herein by reference.

BACKGROUND

"Smart devices" have become increasingly popular and can be found in many places, including cars, home security systems, and health monitors, among others. A smart device is an electronic device, generally connected to other devices or networks, that can operate to some extent interactively and to some extent autonomously. Smart devices include sensors that collect sensor or measurement data about their environments, and actuators that accept instructions or commands and perform actions in the physical world. Examples of sensors include smart smoke detectors, thermometers, heart rate monitors, continuous glucose meters, etc. Examples of actuators include smart fire alarms, sprinkler systems, insulin injector implantations, etc. Many smart devices are able to communicate with other devices over the Internet. Together, smart devices communicating with each other are popularly referred to as the Internet of Things (IoT). The terms "IoT device" and "smart device" are used interchangeably herein.

IoT systems have been developed that allow responses to be triggered by actuator device(s) upon the receipt of appropriate stimuli from sensor device(s). For example, a diabetes patient can connect his or her continuous glucose meter (CGM) into the cloud, where a rule may execute causing insulin to be injected via an insulin injector device implanted on the patient's body (the response) if the patient's blood sugar level as measured by the CGM crosses a threshold value (the stimulus). Such IoT systems currently exist as cloud-based PaaS (platform as a service) solutions or are run privately as middleware applications by, e.g., enterprises. In the cloud-based PaaS solutions, sensors and actuators are connected to a cloud, where the processing and storage of sensor data and the triggering of responses occurs. Popular cloud-based PaaS solutions include AWS® IoT Cloud, IBM Bluemix®, and Azure® IoT. The advantages of such cloud-based PaaS solutions include central management of devices in the cloud, scalability (any number of additional IoT devices may be connected to the cloud and rules added to the cloud), and fault tolerance. The disadvantages of cloud-based PaaS solutions include network latency and unreliability, as the triggering of responses may be delayed by network latency or not occur at all if the Internet connections of sensors and/or actuators are lost. Privacy is also a concern when sensitive data from a sensor belonging to one organization is sent to a "public" cloud that is managed by a different organization and shared by many tenants. There may also be legal limitations to sending confidential sensor data to the cloud. For example, some sensor data may not be allowed to be stored across certain geographic boundaries if the data is for government, defense, or financial institutions. This is an issue because the exact storage location of a public, multi-tenant cloud is usually not controlled by tenants.

In contrast to cloud-based PaaS solutions, private IoT systems ensure data privacy by using a local server or cluster of servers to process (and store) sensor data and to send instructions to actuators. Popular private IoT systems include ThingWorx®, Nextcloud® Box, and the open source Kaa. The disadvantages of private IoT systems include lack of scalability and difficulty incorporating new domain knowledge and sensors. Scalability may be an issue, as privately managed data centers are expensive to run and expand. For example, in an industrial automation scenario, the number of smart devices may increase exponentially as new smart devices are adopted, but a private IoT system may be not be scalable to incorporate such new smart devices. New domain knowledge and sensors are difficult to incorporate into private IoT systems, as doing so typically requires the rules engine of a local server or cluster of servers (of which there may be many) to be manually updated each time new domain knowledge or sensors are added. For example, a medical IoT system should be able to administer different combinations of drugs or interpret symptoms differently based on the latest research without changing existing sensors, but it can be difficult to continuously update a local rules engine in a private medical IoT system based on the latest research.

SUMMARY

One or more embodiments provide a method of deploying a hierarchical internet-of-things (IoT) system. The method generally includes retrieving, by each of a plurality of computing systems from a cloud hub of the IoT system, an image of an IoT platform. The method further includes executing, by each of the plurality of computing systems, a respective local hub of the IoT system comprising one or more virtual machines (VMs) using the image of the IoT platform. The cloud hub, the local hubs executed with the plurality of computing systems, and devices that are connected to the cloud hub and to the local hubs are organized in a tree hierarchy which includes the cloud hub as a root node, the local hubs as branch nodes, and the devices as leaf nodes.

Another embodiment provides an internet-of-things (IoT) system including a plurality of devices, a cloud hub, and a plurality of computing systems. Each of the computing systems is configured to retrieve an image of an IoT platform from the cloud hub, and execute a respective local hub comprising one or more virtual machines (VMs) using the image of the IoT platform. The cloud hub, the local hubs, and devices that are connected to the cloud hub and to the local hubs are organized in a tree hierarchy which includes the cloud hub as a root node, the local hubs as branch nodes, and the devices as leaf nodes.

Further embodiments include a non-transitory computer-readable storage medium storing instructions that, when executed by a computing system cause the computer system to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
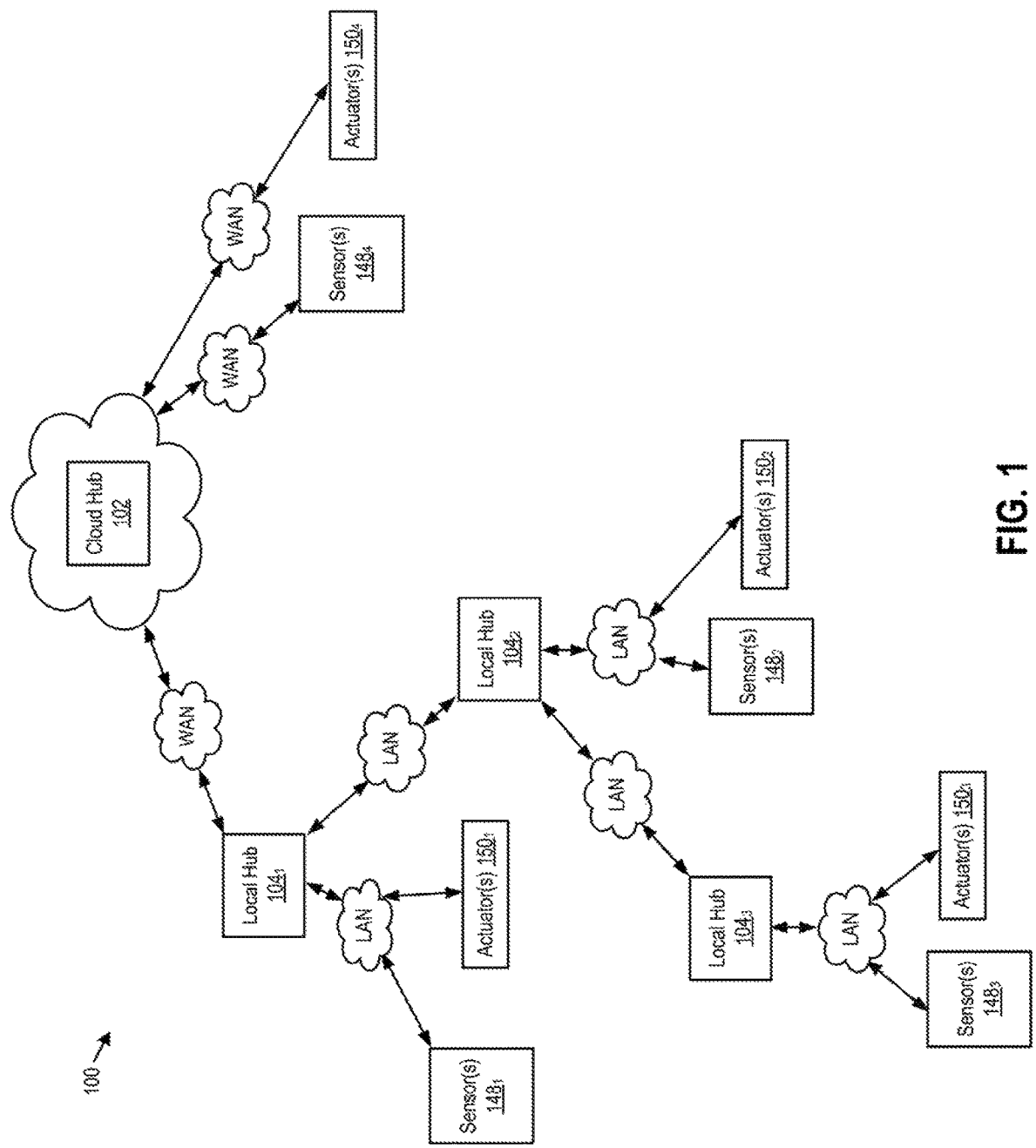
FIG. 1 is a block diagram illustrating an Internet of Things (IoT) system in which one or more embodiments of the present disclosure may be utilized.

Embodiments disclosed herein relate to Internet of Things (IoT) systems organized as tree hierarchies in which rule processing can occur at each level of the tree hierarchies. In the IoT system according to one embodiment, formulas are defined and centrally managed at a cloud hub that is a root of a tree hierarchy. As used herein, a "hub" refers to a virtual computing instance or a cluster of virtual computing instances (or physical machine(s)) that run an instance of an IoT platform, and a "formula" refers to a rule associating a stimulus, which may be defined as a function over data from one or more sensor devices, to a response in the form of actions performed by one or more actuator devices. Each formula defined at the cloud hub is percolated down to a hub, which may be the cloud hub itself or a local hub, in the tree hierarchy that is logically closest to devices specified in the formula. Such a logically closest hub is (1) a common parent (or ancestor) in the tree hierarchy of devices specified in the formula, and (2) nearest to those devices in the tree hierarchy, i.e., lowest in the tree hierarchy if the cloud hub is a root at the top of the tree hierarchy and devices of the IoT system are leafs of the tree hierarchy. By persisting and executing the formula at a logically closest hub rather than always in the cloud, the network latency and failure issues described above as being drawbacks to cloud-based PaaS IoT systems can be avoided. Further, sensor data utilized to process the formula is not percolated up the tree hierarchy beyond the logically closest hub where the formula processing occurs, thereby maintaining privacy by, e.g., preventing sensitive sensor data from being sent to a public cloud. Further yet, by defining/managing formulas in a central cloud hub and percolating those formulas down to local hubs, new domain knowledge and sensors can be incorporated without requiring the local hubs to be manually updated. In addition, the IoT system may be scaled horizontally by adding processing nodes (e.g., virtual machines) to a hub, as well as vertically by adding more hubs to the tree hierarchy.

In one embodiment, each of the cloud and local hubs in the IoT system utilize the same core IoT platform image, providing ease of management. In particular, the cloud and local hubs may each include clusters of virtual computing instances (or physical machines), such as virtual machines (VMs) or containers, that execute the IoT platform in order to process sensor data and trigger responses. Deployment, upgrading, versioning, and the like are centrally handled by the cloud hub. For example, the cloud hub may propagate the IoT platform image (or upgrades) down to local data centers in order to deploy local hubs therein using the IoT platform image (or upgrades). In addition, each hub handles failures of individual virtual computing instances (or physical machines) by re-assigning data processing to other virtual computing instances (or physical machines) in the hub's cluster, thereby providing fault tolerance at the hub level.

In another embodiment, the cloud hub permits formulas to be defined with basic stimuli and responses, as well as with higher-order stimuli and responses that combine previously defined stimuli (with other stimuli and/or raw sensor data) and responses, respectively. Doing so permits users to codify domain-specific knowledge in a form that is understandable to other users and can be incorporated into formulas, without having to deal with low-level devices. For example, assume a thermometer provides raw temperature data that satisfies a stimulus of "fever" if a body temperature is greater than 38° C. In such a case, a higher-order stimulus associated with another medical condition (e.g., a heart attack) may be defined that requires the fever stimulus as well as one or more other stimuli, such as an elevated heart rate above a threshold value. In turn, a response may be triggered when the higher-order stimulus is satisfied based on a stored formula that maps the higher-order stimulus to the response.

FIG. 1 is a block diagram illustrating an IoT system in which one or more embodiments of the present disclosure may be utilized. As shown, IoT system 100 is organized in a tree hierarchy. Cloud 102 and local 104 hubs are root and branch nodes of the tree hierarchy, respectively, while sensor 148 and actuator 150 devices are leaf nodes of the tree hierarchy. Each of cloud 102 and local 104 hubs may include a virtual computing instance, such as VMs or containers, or a cluster of virtual computing instances or physical machine(s) provides an instance of an IoT platform. In one embodiment, cloud hub 102 may be shared among and manage multiple tenants, as described in greater detail below, while local hubs 104 may be owned by individual tenants. In such a case, it may appear to each tenant as if they are the only user of IoT system 100.

Cloud hub 102 is responsible for deploying and updating the IoT platform software of local hubs 104 in the tree hierarchy, as well as managing local hubs 104 and devices, including sensors 148 and actuators 150. For example, a user may purchase hardware (e.g., one or more servers or other computing systems) for a local hub 104 and install on the hardware bootstrapping software that automatically downloads a VM image of the IoT platform from cloud hub 102 and executes VM(s) that use the image of the platform image. Upgrades and new versions of the IoT platform may likewise be downloaded and executed automatically. In addition, cloud hub 102 may store the entire structure of the tree hierarchy in one embodiment, allowing the tree hierarchy be recreated (by redeploying local hubs, etc.) if necessary, such as when hub(s) fail.

Each hub in IoT system 100 may have any number of direct child hubs and directly connected sensors and actuators. As used herein, a "direct child" or a node located "directly" underneath another node in the tree hierarchy refers to a hub or device that is connected to a parent hub without an intermediary hub between the node and the parent hub in the tree hierarchy. For example, local hub $104_2$ is a direct child of local hub $104_1$, and local hub $104_1$ is a direct parent of local hub $104_2$. In contrast, an "indirect child" or node located "indirectly" underneath another node in the tree hierarchy refers to a hub or device that is connected to a parent hub through an intermediate hub in between the child and the parent. For example, local hub $104_3$ is an indirect child of local hub $104_1$, and local hub $104_1$ is an indirect parent of local hub $104_3$. Indirect parents are also referred to herein as ancestors.

Cloud hub 102 is connected to its direct children through a network, which as shown is a wide area network (WAN) (e.g., the Internet). In one embodiment, cloud hub 102 runs in a public cloud shared by tenants from separate organizations. In another embodiment, cloud hub 102 may run in a private cloud owned and operated by a single organization.

Each of local hubs 104 may be connected to any number of sensors 148 and actuators 150 through a network, which is shown as a local area network (LAN) but may be any reliable and fast connection, such as a direct link, a Multi-protocol Label Switching (MPLS) network, a "stretched" layer-2 (L2) network, or even a WAN. As described, a sensor is a device that senses or measures certain characteristics of the physical world and converts the measurements into data for processing, while an actuator is a type of device that accepts digital instructions or commands and performs action(s) in the physical world. Sensors and actuators may also be combined in some devices.

In addition to being connected to sensors 148 and actuators 150, each local hub 104 may also be in communication with other local hub(s) 104 through network(s), which as shown are LANs (e.g., LANs overlaid on a WAN such as the Internet) but may generally be any type of network. Each of local hubs 104 may manage any number of other local hubs 104, leading to a tree hierarchy structure having cloud hub 102 as a root node that manages all local hubs and devices, local hubs 104 as branch nodes that manage child hubs and devices, and sensors 148 and actuators 150 as leaf nodes. In one embodiment, configuration and state information relating to devices 148 and 150 may be managed by local hubs 104 directly connected to those devices and also percolated up the tree hierarchy to all (direct and indirect) parent hubs, including cloud hub 102.

The organization of cloud hub 102, local hubs 104, and sensors 148 and actuators 150 into a tree hierarchy in IoT system 100 provides a number of advantages. As described, formulas may be defined at cloud hub 102 but percolated down to local hubs 104 that are logically closest to devices specified in the formulas. Local hubs 104 may then operate independently to process data and issue instructions to actuators according to stored formulas, without having to send data to the cloud. As a result, the low latency requirements of many real world smart devices may be satisfied. For example, a local hub and devices connected to that hub may be on the same private network (e.g., a LAN), resulting in minimal network latency and the ability to process sensor data even when Internet connectivity to the cloud hub is lost. Further, by processing sensor data at the logically closest hub and not percolating such data further up the tree hierarchy, privacy is maintained by, e.g., preventing sensitive sensor data from being sent to a public cloud. As formulas are defined and managed at a central cloud hub 102 and percolated down the tree hierarchy to local hubs 104, new domain knowledge and sensors can be incorporated using new formulas defined at cloud hub 102, without requiring manual updating of local hubs 104. In addition, the IoT system 100 is easily scalable, as each of the local hubs 104 and cloud hub 102 is independently scalable "horizontally" by adding more virtual computing instances and/or physical machines to that hub, and IoT system 100 is also scalable "vertically" by adding more hubs to the tree hierarchy (e.g., at new levels of the tree hierarchy). For example, virtual computing instances (and associated hardware, or simply hardware if virtual computing instances are not used) may be added to a hub cluster when that cluster does not have enough compute, memory, and/or disk resources to process data generated by devices relying on the cluster. Or another hub could be created to process some of the device data that the hub cluster does not have enough compute, memory, and/or disk resources to process. Vertical scaling may also be utilized for security purposes to create another hub at which sensor data is processed but not permitted to percolate further up the tree hierarchy.

Figure 2:
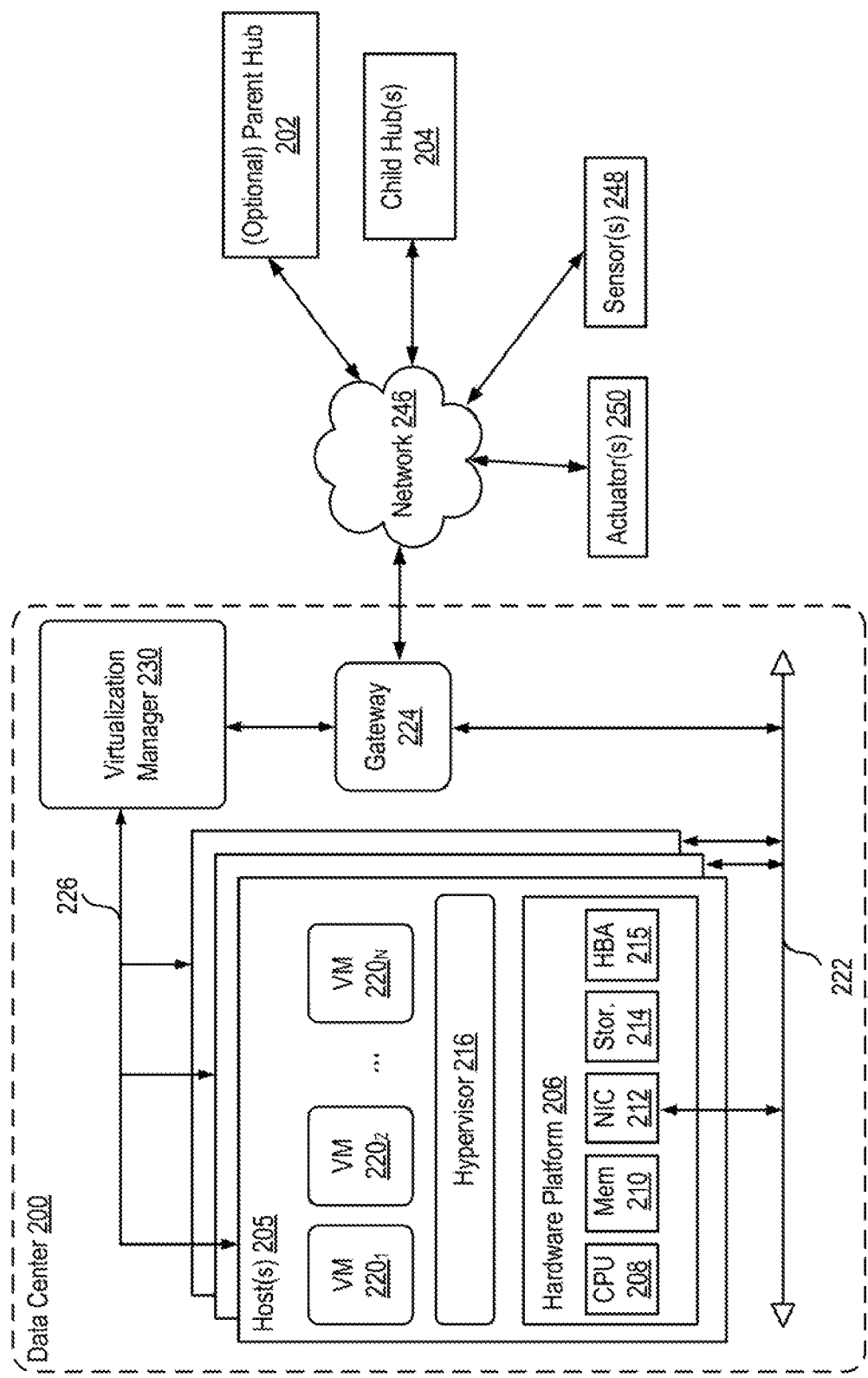
FIG. 2 is a block diagram illustrating a data center in which a hub runs, according to an embodiment.

FIG. 2 is a block diagram illustrating a data center 200 in which a hub runs, according to an embodiment. The hub may be one of local hubs 104 or cloud hub 102 (in which case there would be no parent hub 202). Although shown for illustrative purposes as VMs 220 running in data center 200, it should be understood that a hub may generally include any number of virtual computing instance(s) and/or physical machine(s) which may (or may not) form a cluster and run an instance of an IoT platform. As discussed in greater detail below with respect to FIGS. 3-4, the VMs in a hub may run a number of core modules of the IoT platform, as well as additional modules if the hub is a cloud hub.

As shown, data center 200 includes hosts 205, a virtualization manager 230, and a gateway 224. Each of hosts 205 may be constructed on a server grade hardware platform 206, such as an x86 architecture platform. For example, hosts 205 may be geographically co-located servers on the same rack. As shown, hardware platform 206 of each host 205 may include conventional components of a computing device, such as one or more processors (CPUs) 208, system memory 210, a network interface 212, storage system 214, optionally a local host bus adapter (HBA) 215, and other I/O devices such as, for example, a mouse and keyboard (not shown).

CPU 208 is configured to execute instructions, for example, executable instructions that perform one or more operations described herein and may be stored in memory 210 and in storage. Memory 210 is hardware allowing information, such as executable instructions, configurations, and other data, to be stored and retrieved. Memory 210 is where programs and data are kept when the processor is actively using them. Memory 210 may be byte-addressable, random access memory. Memory 210 may include, for example, one or more random access memory (RAM) modules. Network interface 212 enables host 205 to communicate with other devices via a communication medium, such as a network 122 within data center 200. Network interface 212 may include one or more network adapters, also referred to as Network Interface Cards (NICs). Storage system 214 represents local persistent storage devices (e.g., one or more hard disks, flash memory modules, solid state disks, and/or optical disks). Host bus adapter (HBA) couples host 205 to one or more external storages (not shown), such as a storage area network (SAN). Other external storages that may be used include network-attached storage (NAS) and other network data storage systems, which may be accessible via NIC 212.

As shown, host 205 is configured to provide a virtualization layer, also referred to as a hypervisor 216, that abstracts processor, memory, storage, and networking resources of hardware platform 206 into multiple virtual machines $220_1$ to $220_N$ (collectively referred to as VMs 220 and individually referred to as VM 220) that run concurrently on the same hosts. One example of a hypervisor 216 that may be used in one embodiment is a VMware ESXi™ hypervisor provided as part of the VMware vSphere® solution made commercially available from VMware, Inc. of Palo Alto, Calif. Hypervisor 216 may run on top of the operating system in host 205 or directly on hardware components of host 205.

A virtualization management component 230 communicates with hosts 205 via a network, shown as a management network 226, and carries out administrative tasks for data center 200 such as managing hosts 205, managing local VMs 220 running within each host 205, provisioning VMs, migrating VMs from one host to another host, and load balancing between hosts 205. Virtualization manager 230 may be a computer program that resides and executes in a central server in data center 200 or, alternatively, virtualization manager 230 may run as a VM in one of hosts 205. One example of a virtualization manager is the vCenter Server™ product made available from VMware, Inc.

Gateway 224 (e.g., executing as a virtual appliance) provides VMs 220 and other components in data center 200 with connectivity to a network 146 used to communicate with an (optional) parent hub 202, child hub(s) 204, sensor(s) 148, and actuator(s) 150. Any suitable network 146 may be used, such as one or more of: a LAN, a WAN, a direct link, a PAN, MPLS, or a "stretched" L2 network. Further, although one network 146 is shown for simplicity, it should be understood that VMs 220, parent hub 202, child hub(s) 204, sensor(s) 148, and actuator(s) 150 may generally communicate via any number of networks. Gateway 224 may manage external public IP addresses for VMs 220 and route traffic incoming to and outgoing from data center 200 and provide networking services, such as firewalls, network address translation (NAT), dynamic host configuration protocol (DHCP), and load balancing. Although a gateway 224 providing connectivity to sensor(s) 248 and actuator(s) 250 via network 246 is shown for illustrative purposes, it should be understood that a gateway may be unnecessary in some embodiments (e.g., when a hub and sensors and actuators connected to the hub are on the same local network).

In one embodiment, cloud hub 102 may include VMs that are deployed using the same core IoT platform VM image that is used to deploy VMs in local hubs 104. It should be understood that the core IoT platform VM image may include the same code that is executed in cloud 102 and local hubs 104, but the data being stored and processed by VMs in each of the cloud 102 and local hubs 104 may be different if the hubs are connected to different sensor devices. In addition, the cloud hub VM image may include some (e.g., management) modules that are not present in the core IoT platform image used by local hub 104 VMs, as discussed in greater detail below with reference to FIGS. 3-4. As the VMs of cloud 102 and local hubs 104 are deployed using an identical core IoT platform image, management of such VMs is simplified. For example, to deploy or update IoT system 100, a core IoT platform image (or an updated image) in the form of a VM snapshot may be pushed down from cloud 102 to local hubs 104, and VMs may then be deployed and executed in local hubs 104 using the VM snapshot image.

VMs 220 that perform the functions of an IoT platform, including processing sensor data and issuing instructions to actuators, constitute an "instance" of the IoT platform that is also a hub in IoT system 100. In one embodiment, each of cloud hub 102 and local hubs 104 may be implemented as a cluster of VMs. The VMs within such a cluster may be allocated to process data from sensors and/or send instructions to actuators in any suitable manner. In one embodiment, processing within each of cloud hub 102 and local hubs 104 may be distributed among VMs using a consistent hashing technique, and the processed results may be combined together using a conflux technique, described in V. Eswara et al., "Conflux: Distributed, real-time actionable insights on high-volume data streams", Computer Measurement Group 3rd Annual Conference (2016), which is incorporated by reference herein in its entirety. Consistent hashing techniques are useful for distributing workloads across processing nodes using a consistent hash function which changes minimally as the range of the function changes. Conflux techniques are useful for merging data streams to provide distributed, real-time insight into (high-volume) data streams. Together, consistent hashing and conflux techniques may be utilized to distribute the processing of data streams from sensors and combine the results into actions to be performed by actuators. It should be understood that the use of consistent hashing and conflux techniques permits workloads to be automatically rebalanced when VMs in the cluster of VMs go down or new VMs are added to the cluster, without any downtime. This is in contrast to the manual updating of the rules engine in private IoT systems described above, which requires downtime when new sensors are added.

Figure 3:
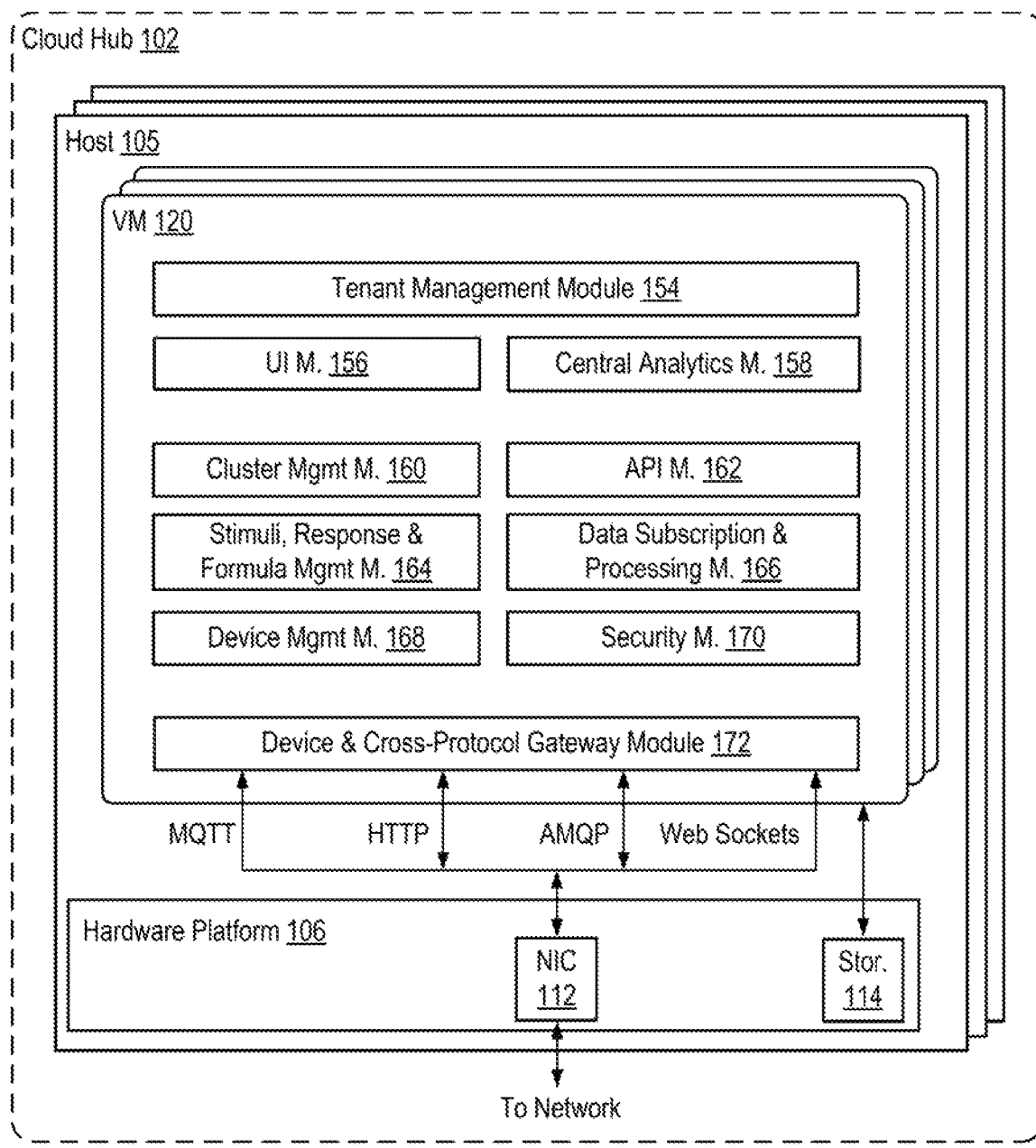
FIG. 3 is a block diagram illustrating components of a cloud hub in an IoT system, according to an embodiment.
Figure 4:
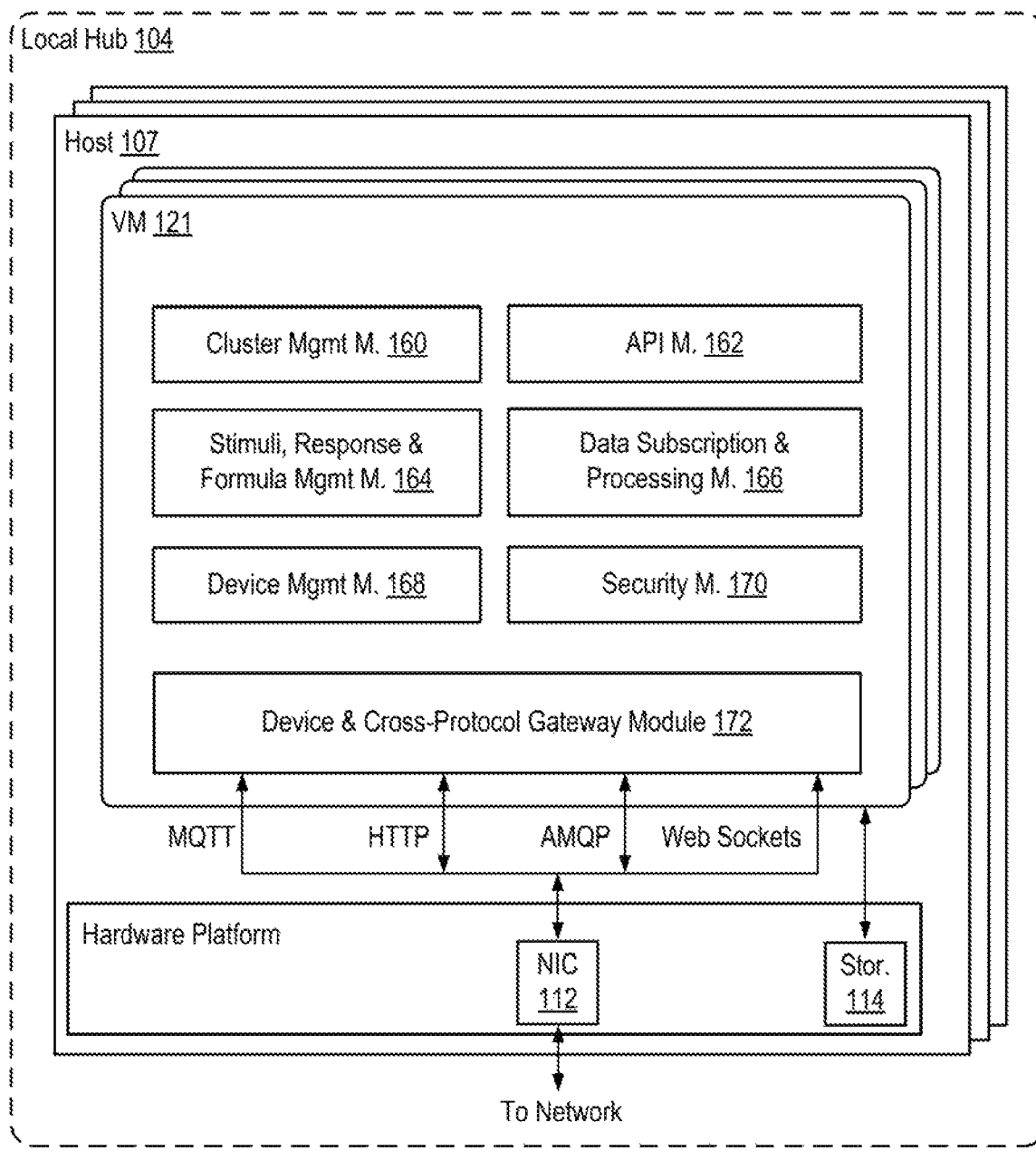
FIG. 4 is a block diagram illustrating components of a local hub in an IoT system, according to an embodiment.

FIG. 3 is a block diagram illustrating components of cloud hub 102 in IoT system 100, according to an embodiment. FIG. 4 is a block diagram illustrating components of a local hub 104 in IoT system 100, according to an embodiment. As shown, VMs, including VMs 220 and 121 (which may be other types of virtual computing instances such as containers or physical machines in alternative embodiments) run in hosts 105 and 107, respectively, and execute the same logical modules of the core IoT platform, shown as modules 162-170. In addition, certain logical modules, shown as modules 154, 156, and 158, run uniquely in cloud hub 102 VMs and are not present in local hub 104 VMs.

The modules that are unique to cloud hub 102 include a tenant management module 154, a user interface (UI) module 156, and a central analytics module 158. Tenant management module 154 of VM 220 manages tenants and corresponding users associated with the tenants of data center 200. In one embodiment, tenant management module 154 tracks which devices (e.g., sensors 148 and actuators 150) and tree hierarchies are associated with which user and tenant, and tenant management module 154 further manages access to tenant data to ensure that tenants do not have access to each other's data.

Another module unique to cloud hub 102 is UI module 156, which supports data and cluster visualization for management of devices and of formulas, stimuli, and responses. For example, a user may define stimuli, responses, and/or formulas through a UI provided by UI module 156. As described, each formula defined at cloud hub 102 is percolated down the tree hierarchy to a local hub 104 that is logically closest to devices specified in the formula. UI module 156 may also permit higher-order stimuli and responses to be defined in terms of previously defined primitives over raw data, including previously defined stimuli, responses, and formulas, rather than raw sensor data itself. For example, higher-order stimuli and responses may be defined that combine other stimuli and responses, respectively, such as the stimuli and responses in previously defined formulas. In one embodiment, each previously defined stimulus and response may be associated with a user-given name (e.g., "fever"), and UI module 156 may display to a user in a domain (e.g., an organization) the names of previously defined constructs including stimuli, responses, and formulas (which include stimuli and responses) in the same domain and permit the user to re-use those stimuli and responses to define new stimuli and responses, respectively, that may be used in formulas. UI module 156 may also support management in a tenant-aware manner, in conjunction with tenant management module 154.

Yet another module unique to cloud hub 102 is central analytics module 158, which supports various data processing requirements. Data that is processed by central analytics module 158 may include data associated with one or more tenants, and central analytics module 158 may generally perform more complex data processing than that performed by data subscription and processing (DSP) module 166 within local hubs 104, discussed in greater detail below. In particular, central analytics module 158 may process a larger amount of data encompassing a longer period of time than data processed by DSP module 166, and central analytics module 158 may also perform complex analyses such as the running of machine learning algorithms on the data. In some embodiments, central analytics module 158 may support data processing frameworks such as Apache Spark™, Apache Storm™, Apache Flume™, and the like.

As shown, the core IoT platform modules that execute in both cloud hub 102 and local hubs 104 include a cluster management module 160; an application programming interface (API) module 162; a stimuli, response, and formula management module 164; a data subscription and processing module 166; a device management module 168; a security module 170; and a device and cross-protocol gateway (DCPG) module 172. As shown, cluster management module 160 manages the cluster of VMs running in a hub, such as VMs 120 in cloud hub 102 or VMs 121 in local hub 104. The cluster of VMs is managed by cluster management module 160 to form a single, highly available, and fault-tolerant instance of the IoT platform which processes sensor data and issues actuator instructions. As described, high availability and fault-tolerance may be achieved using consistent hashing and conflux techniques in one embodiment.

API module 162 exposes an API allowing create, read, update, delete (CRUD) operations on stimuli, responses, and formulas in IoT system 100. Such operations permit users to create, read, and modify how stimuli are defined and what responses occur as a result of the stimuli. As used herein, a stimulus may include raw (unprocessed) data from a single sensor crossing a threshold, such as a temperature reading at or above 38° C., or a stimulus may be a complex, derived, or inferred value based on some aggregate or function of data received from one sensor (e.g., over a time period) or from a set of distinct sensors. For example, a "rain warning" stimulus may occur from a daily aggregate threshold function of temperature and pressure data collected from multiple sensors over a specific neighborhood. A stimulus function may be denoted as ST(s1, s2, . . . sn), which is a stimulus function over sensors s1 through sn. A response may include the action of triggering an actuator, or in a more complex case, triggering one or more actuators, in a certain order, for a certain period of time each, in a certain manner. For example, a motion detector stimulus may trigger a "burglar alarm" response, which may involve turning on lights and an audio alarm, as well as contacting law enforcement over a secure connection through the Internet and/or telephone. A response function may be denoted as R(a1, a2, . . . an), which is a response function over actuators a1 through an. A formula is a function that associates a stimulus with a response by causing the triggering of the response in reaction to the stimulus being satisfied. For example, a formula may be defined associating the burglar alarm response with the motion detection stimulus described above. A formula function may be denoted as F=(ST(s1, s2, . . . sn)→R(a1, a2, . . . an)), where the "→" separates the stimulus function on the left from the response function on the right, and maps the stimulus to the response. Although described herein primarily with respect to stimuli and responses that are defined as part of a formula, it should be understood that stimuli and responses may also be defined independently of any formulas. For example, stimuli and responses may be defined as "building blocks" for higher order stimuli and responses, discussed above, which may themselves be used in formulas.

API module 162 also supports registering devices (e.g., sensors 148 and actuators 150) and registering local hubs 104 with their (direct and indirect) parent hubs, including cloud hub 102. Registering of devices in IoT system 100 may be performed in conjunction with device management module 168, as described in greater detail below. API module 162 further supports subscribing to data streams, which may include raw sensor data and/or processed/aggregated data, from sensors 148 and hubs 104 which are direct or indirect children of the hub in which API module 162 runs. In an embodiment, the API exposed by API module 162 is a Hypertext Transfer Protocol (HTTP) Representational State Transfer (REST) based API.

Stimuli, response, and formula management (SRFM) module 164 supports tenant-specific CRUD operations on stimuli, responses, and formulas within cloud hub 102, as exposed by API module 162. In particular, SRFM 164 subscribes to sensor data streams required to evaluate stimulus functions and to trigger responses. SRMF 164 is also responsible for formula percolation down the tree hierarchy, as described below with reference to FIG. 5.

Data subscription and processing (DSP) module 166 receives sensor data from all subscribed sources and evaluates whether the data satisfies pre-defined stimulus function definitions. If the data satisfies a stimulus function definition, DSP module 166 activates target actuator(s) 150 associated with the stimulus based on a formula relating the stimulus to a response. DSP module 166 may also persist sensor data it receives and/or stimulus inferences that it determines in a storage, such as storage 214. DSP module 166 is described in greater detail below with reference to FIG. 6. In addition to stimuli defined in terms of raw sensor data, higher-order stimuli and responses may also be defined using previously defined (and named) primitives over raw sensor data, which may include previously defined stimuli, responses, and formulas. For example, a high-order stimulus may be defined that includes one or more other stimuli from previously defined formula(s) being satisfied, and similarly responses may be combined with other responses from previously defined formula(s) to define a higher-order response. DSP module 166 may also evaluate whether such higher-order stimuli are satisfied in one embodiment. As described, one example of a higher-order stimulus may require a "fever" stimulus that is satisfied when a patient's body temperature is above 38° C. to occur at the same time as an elevated heart rate stimulus that is satisfied when the patient's heart rate is above a threshold, and such a higher-order stimulus may be associated with a particular medical condition (e.g., a heart attack). It should be understood that, by defining higher-order stimuli, inferences may be made of such stimuli and displayed to a user (rather than inferences of stimuli based on raw sensor data) and/or utilized in formulas.

Device management module 168 makes use of the gateway provided by DCPG module 172 to manage devices (e.g., sensors 148 and actuators 150) that are being added to or removed from IoT system 100. Device management module 168 also handles device discovery and assists with device registration, in which each device is assigned a unique hierarchical identifier. As used herein, device discovery refers to the identification of a device that has connected to a hub, while registration is the process by which the hub that discovers a device assigns a globally unique hierarchical identifier to the device and percolates the unique hierarchical identifier up the tree hierarchy. The device management module 168 running in cloud hub 102 may also track the state of each device in IoT system 100 so that the overall health of IoT system 100 may be evaluated.

In one embodiment, local hubs 104 may also be assigned globally unique identifiers. In such a case, each device 148 or 150 and local hub 104 may be addressed using a dot notation that sequentially concatenates all hub identifiers required to reach that device 148 or 150 or local hub 104. For example, in FIG. 1, sensor $148_3$ is managed by hub $104_3$, which in turn is managed by hub $104_2$ that is itself managed by hub $104_1$, and hub $104_1$ is managed by cloud hub 102. The identifier of sensor $148_3$ in dot notation may then be: $104_1.104_2.104_3.148_3$. As another example, the identifier of sensor $148_4$ may simply be $148_4$, as sensor $148_4$ is directly connected to cloud hub 102. As the identifiers for devices and hubs are namespaced under their respective tenants, this addressing scheme ensures tenant validation when defining new stimuli, responses, and formulas over devices. As described in greater below with respect to FIG. 5, this addressing scheme may also be used by hubs that receive stimulus, response, and formula definitions to determine whether to percolate those definitions down the tree hierarchy for processing by another hub or to perform such processing locally.

Device management module 168 may also map unique hierarchical identifiers to protocol-specific identifiers for each device. For example, with the Message Queue Telemetry Transport (MQTT) protocol, the MQTT "client id" may be mapped to hierarchical identifiers generated by device management module 168.

Security module 170 manages secure communications between devices and modules 154-172 running in VM 220. For example, tenants of IoT system 100 may configure and manage security certificates used to communicate between hubs 102 or 104 and devices, such as sensors 148 and actuators 150.

Device and cross-protocol gateway (DCPG) module 172 is responsible for converting data and commands from protocols used by devices to message formats that are used by one or more of modules 154-170. For example, DCPG module 172 may convert MQTT, WebSockets, HTTP, Advanced Message Queuing Protocol (AMQP), Bluetooth, and/or Zigbee messages received from devices into JavaScript Object Notation (JSON) messages that each include a tuple of ID, timestamp, and value. Such a tuple may then be hashed, when one of the JSON messages lands on a consistent hashing ring, according to the consistent hashing technique described above to determine a virtual computing instance (or a physical machine) in a cluster to process the sensor data in a message.

Figure 5:
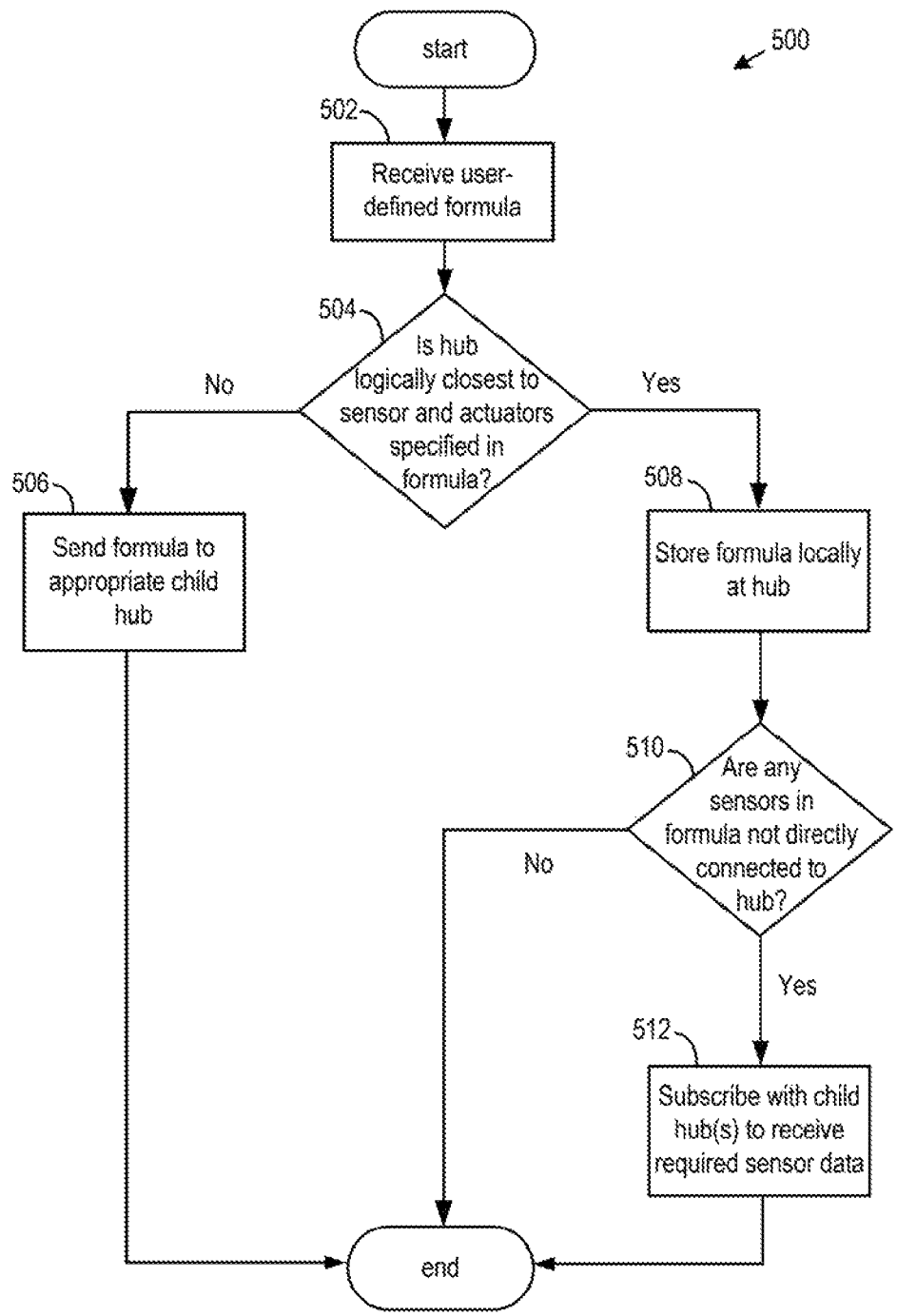
FIG. 5 depicts a flow diagram of a method for determining whether to process a formula locally or to propagate the formula down a tree hierarchy and subscribing to data streams, according to an embodiment.

FIG. 5 depicts a flow diagram of a method 500 for determining whether to process a formula locally or to propagate the formula down a tree hierarchy and subscribing to data streams, according to an embodiment. As shown, method 500 begins at step 502, where a hub (e.g., cloud hub 102 or one of local hubs 104) receives a user-defined formula. As described, a user may utilize a UI to define a formula at cloud hub 102 that is a root of the tree hierarchy, and the formula is then percolated down the tree hierarchy to a hub that is logically closest to devices specified in the formula. Defining a formula may include defining a stimulus function and a response function, and associating the two within the formula. Examples of formulas are $F1=(ST(148_1) \rightarrow R(150_1))$ and $F2=(ST(148_2, 148_3) \rightarrow R(150_3))$. Formula F1 specifies that if data from sensor $148_1$ evaluates to a stimulus, then activate actuator $150_1$. Formula F2 specifies that if data from sensors $148_2$ and $148_3$ evaluate to a stimulus, then activate actuator $150_3$. Formulas F1 and F2 assume that local hubs $104_1$, $104_2$, and $104_3$ are all owned by the same tenant. In addition, it should be understood that devices such as devices $148_1$, $148_2$, $148_3$, and $150_3$ may be specified in formulas by their dot-notation addresses, which in the cases of devices $148_1$, $148_2$, $148_3$, and $150_3$ are $104_1.148_1$, $104_1.104_2.148_2$, $104_1.104_2.104_3.148_3$, and $104_1.104_2.104_3.150_3$, respectively.

At step 504, the hub parses the received formula and determines whether that hub is logically closest to the sensor and actuators specified in the formula. As described, logically closest includes being (1) a common parent (or ancestor) in the tree hierarchy of devices specified in the formula, and (2) nearest to those devices in the tree hierarchy, i.e., lowest in the tree hierarchy if the cloud hub is a root at the top of the tree hierarchy and devices of the IoT system are leafs of the tree hierarchy. For example, a hub may be logically closest to devices specified in a formula if those devices are directly connected to the hub and none of those devices are directly connected to child hubs. In one embodiment, the hub (and, specifically, SRFM module 164 running in the hub) determines a common prefix of all addresses of devices specified in the formula. Such a common prefix of device addresses will usually reveal the hub that is logically closest to those devices, and if the device addresses do not share a common prefix, then the formula may be stored in cloud hub 102. As described, configuration and state information of devices managed by local hubs 104 are stored locally and also percolated up the tree hierarchy to all parent hubs 104 (if any) and to cloud hub 102. As a result, the cloud 102 and parent 104 hubs are aware of devices (and associated addresses) that are directly connected to them, as well as devices (and associated addresses) in the sub-tree under them. The addresses of such directly-connected devices and devices in the sub-tree may then be used to determine the common prefix that the addresses of devices specified in a formula share, which may in turn be used to determine where the formula should be percolated down the tree hierarchy. Returning to the example formula F1 above, the dot-notation addresses of sensor $148_1$ and actuator $150_1$ are $104_1.148_1$ and $104_1.150i$, respectively. The common prefix in this case is $104_1$, indicating that the formula should be percolated to local hub $104_1$. As a result, cloud hub 102 will send formula F1 down to local hub $104_1$, while local hub $104_1$ will store and process formula F1 locally, without percolating the formula further down the tree hierarchy. As another example, in the case of formula F2 above, the dot-notation addresses of sensors $148_2$ and $148_3$ and actuator $150_3$ that are specified in formula F2 are $104_1.104_2.148_2$, $104_1.104_2.104_3.148_3$, and $104_1.104_2.104_3.150_3$, respectively. In this case, the common prefix of the device addresses is $104_1.104_2$, indicating that local hub $104_2$ should store and process formula F2.

If the hub determines at step 504 that the hub is not logically closest to the devices specified in the formula, then at step 506, the hub sends the formula to an appropriate child hub. In one embodiment, the hub may send the formula to the next local hub 104 in the common prefix of the dot-notation addresses of devices specified in the formula.

Returning to the example of formula F1 above, cloud hub 102 may send formula F1 to local hub $104_1$, as the common prefix of the addresses of sensor $148_1$ and actuator $150_1$ specified in formula F1 is $104_1$. Similarly, for formula F2 above, cloud hub 102 may send formula F2 to local hub $104_1$, as the common prefix of the addresses of sensors $148_2$ and $148_3$ and actuator $150_3$ specified in formula F2 is $104_1.104_2$ and local hub $104_1$ is a direct child of cloud hub 102 (while local hub $104_2$ is not). In turn, local hub $104_1$ may send formula F2 down to its child local hub $104_2$ based on the common prefix.

If, on the other hand, the hub determines at step 504 that the hub is logically closest to the devices specified in the formula, then at step 508, the hub stores the formula locally. For example, the formula may be stored in memory or storage of host(s) in which VM(s) of the hub execute, or alternatively in external storage that is connected to such hosts through HBAs.

At step 510, the hub determines whether any sensors 148 in the formula are not directly connected to the hub itself. Returning to the example above, formula F2 is stored at local hub $104_2$ but requires data from sensor $148_3$, which is not directly connected to local hub $104_2$ but is instead directly connected to local hub $104_3$. It should be understood that data from such a sensor that is not directly connected to the hub needs to be obtained through another hub that is directly connected to the sensor.

If the hub determines that any sensors 148 specified in the formula are not directly connected to the hub, then at step 512, the hub subscribes with child hub(s) to receive the required sensor data. For example, this subscribing step may include SRFM module 164 notifying DSP module 166 that a subscription to sensor data needs to be created, and DSP module 166 creating the required subscription by, e.g., invoking the API for subscribing to data that is exposed by API module 162 in the child hub(s). In one embodiment, the hub may only subscribe with its direct child hub(s), which may in turn subscribe with their own child hub(s), etc., in a step-by-step manner until subscription(s) are made with the appropriate local hub(s) that are directly connected to sensor(s) whose data is required. For example, if local hub $104_1$ requires data from any of sensor(s) $148_3$, then local hub $104_1$ may subscribe with its child local hub $104_2$, which in turn subscribes to the appropriate sensor data streams with its child local hub $104_3$ so that such data may be percolated back up from local hub $104_3$ to local hub $104_2$ and ultimately to local hub $104_1$. Although described herein, for simplicity, with respect to registering to receive sensor data, it should be understood that if the formula specifies a higher-order stimulus that combines one or more other stimuli and/or raw sensor data and any of those other stimuli or the higher-order stimulus itself is evaluated at child hub(s), then the IoT platform may also subscribe to receive the other stimuli or the higher-order stimulus needed to evaluate the formula.

As described, no sensor data is allowed to flow higher up the tree hierarchy than where formula(s) that use the data are stored unless explicit permission is given by a user in one embodiment. Doing so increases security, as sensor data is prevented from flowing up to, e.g., a public cloud unless a user allows such a flow of the data. In addition, one embodiment manages sensor data streams by performing reference counting of open streams for each sensor device managed by a hub based on the number of formulas that reference the sensor. In particular, the reference count may indicate the number of hubs, including the hub itself and any hubs higher up in the tree hierarchy that have subscribed to the particular sensor's data. In such case, a reference count of greater than or equal to 1 may indicate that one or more formulas (stored in the hub itself or a higher hub) reference the particular sensor data, while a reference count of 0 may indicate that no active formulas or subscriptions are using the particular sensor data, in which case the data stream may be closed.

Figure 6:
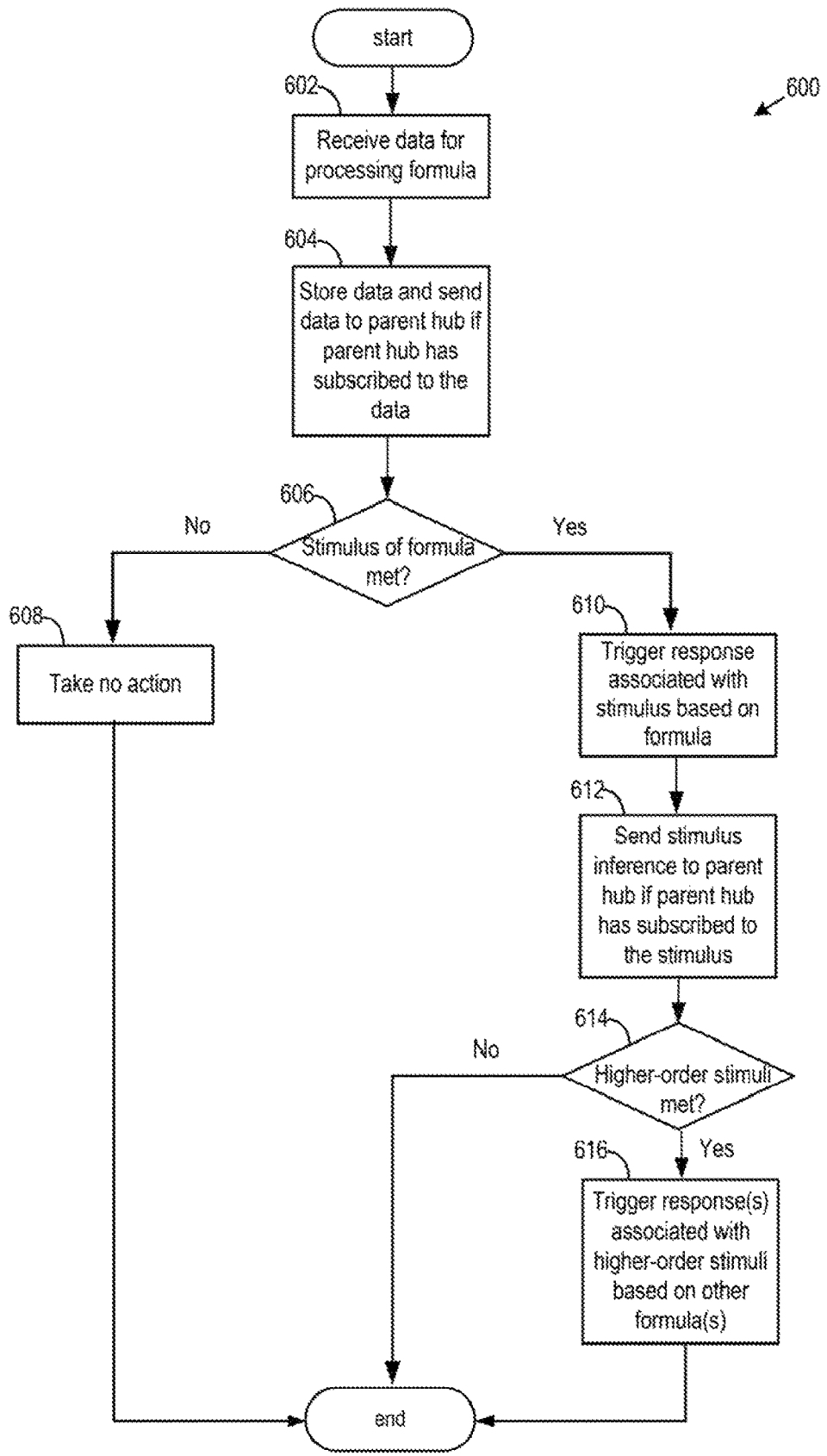
FIG. 6 is a flow diagram illustrating a method for evaluating sensor data and activating actuators when stimuli are satisfied, according to an embodiment.

FIG. 6 depicts a flow diagram of a method 600 for evaluating sensor data and activating actuators when stimuli are satisfied, according to an embodiment. Method 600 of FIG. 6 assumes that a formula has already been percolated down the tree hierarchy to a hub (which may be cloud hub 102 or any of local hubs 104) where the formula is stored and processed. As shown, method 600 begins at step 602, where the hub receives data for processing the formula. In one embodiment, device and cross-protocol gateway module 172 in particular may receive such data. As described, the data for processing a formula may include raw sensor data, received from either sensor(s) that are directly connected to the hub and/or based on subscription(s) to such raw data with child hub(s), as well as data representing one or more stimuli used to evaluate a higher-order stimulus or the higher-order stimulus itself that is generated locally or received from child hub(s) based on subscription(s).

As described, when data for evaluating a formula is received by a cluster of virtual computing instances (or physical machines), the data may be converted from a protocol used by devices to send the data and then distributed for processing to one (or more) of the virtual computing instances (or physical machines) using, for example, a consistent hashing technique. One embodiment may utilize a consistent hash of the hierarchical dot-notation identifiers of sensors from which data is received and a number of virtual computing instances (or physical machines) in the cluster to distribute the sensor data. Further, if any of the virtual computing instances (or physical machines) goes down, then raw sensor data that is received may be redistributed to other virtual computing instance(s) (or physical machines(s)) in the cluster according to, e.g., the consistent hashing technique. In addition, received data may also be stored, such as in memory or storage of a host, in an external storage connected through an HBA, or in another storage device.

At step 604, the hub persists the received sensor data and sends the received sensor data to its parent hub if the parent hub has subscribed to such data. As described, each hub is aware of sensors in the sub-tree under itself and subscribes with child hubs to receive data streams of sensors specified in any formulas that are stored and processed locally when those sensors are not directly connected to the hub. For example, local hub $104_2$ may store and process a formula that requires data from sensor(s) $148_3$ that are not directly connected to local hub $104_2$. In such a case, local hub $104_2$ may subscribe to the data stream(s) of sensor(s) $148_3$ with local hub $104_2$, and local hub $104_3$ may then send to local hub $104_2$ data collected by sensor(s) $148_3$. Further, if any hub requires sensor data from a local hub that is not a direct child of that hub, then the hub may subscribe with its direct child hub, which may in turn subscribe with its own child hub, etc., in a step-by-step manner until a subscription is made with the appropriate local hub that is directly connected to the sensor whose data is required, as described above.

At step 606, local hub 104 determines whether a stimulus of the formula is satisfied by the received data. In one embodiment, DSP module 166 evaluates the formula to determine whether the stimulus is met. It should be understood that the evaluation of formulas does not necessarily have to occur every time associated data is received. For example, humidity and air pressure sensors throughout a city may collect and send minute-by-minute data, but such data may be processed and evaluated just once per hour, or once per day, to take into account changes in humidity and air pressure and determine whether a "rain warning" stimulus is met leading to a response in which actuators (e.g., servers) send rain warning emails to persons of interest. In such a case, stored data may also be retrieved and used, along with currently received data, to evaluate the stimulus. Any suitable frequency for processing data may be used, such as every time raw data is received, every microsecond, every minute, every hour, every day, or every year.

If the stimulus of the formula is not satisfied by the received data, then no action is taken at step 608. On the other hand, if the stimulus of the formula is satisfied by the received data, then at step 610, the hub instructs one or more actuators 150 to perform actions according to the response that the formula associates with the stimulus. In one embodiment, DSP module 166 may evaluate the formula and instruct actuator(s) to perform action(s) by sending message(s) to DCPG module 172, which translates those message(s) to message(s) using protocol(s) understood by actuator(s) 150 to be triggered. DCPG module 172 then sends the translated message(s) to the NIC of its host, which in turn sends the message(s) through a network to the target actuator 150. If any of the actuators 150 in the response are not directly connected to the hub, then messages instructing those actuators 150 to perform actions may be percolated down the tree hierarchy to child hub(s), in a step-by-step manner, until reaching a hub that is directly connected to the actuators 150. In addition, some embodiments may permit users to define higher-order responses that are composed of multiple other responses and, in such a case, those multiple responses may be triggered if stimuli associated with the higher-order responses are satisfied. Stimulus inferences may also be stored for later use in, e.g., determining higher-order stimuli or for analytics purposes.

In a further embodiment, the hub may also access metadata associated with a stimulus and/or formula to determine additional details and criteria for actuator activation. For example, DSP module 166 may access such metadata to determine a duration of actuator activation and a manner of activation. In yet another embodiment, such metadata may be encoded within a response function that is present in the formula associating stimulus to response. Returning to the "rain warning" example above, DSP module 166 may trigger server(s) to send a rain warning e-mail as a response, and metadata encoded within the response function or within the formula may indicate the contents of the email and/or who to send the email to.

At step 612, the hub sends the stimulus inference to hubs higher in the tree hierarchy, if any, that have subscribed to such data. As described, higher-level hubs may subscribe to receive stimulus data that is required, e.g., to evaluate higher-order stimuli specified in formulas that those hubs store and process. If any (direct or indirect) parent hub has subscribed to a stimulus, then the hub may percolate the stimulus inference up the tree hierarchy, in a step-by-step manner to each successive parent hub that has subscribed to the stimulus, until reaching a hub that stores and processes a formula using the stimulus.

At step 614, the hub determines whether any higher-order stimuli in formula(s) stored locally have been met by the stimulus in conjunction with another stimulus or stimuli or raw sensor data, according to definitions of the higher-order stimuli. If any higher-order stimuli have been met, then at step 616, the hub (e.g., DSP module 166 therein) instructs the appropriate actuators 150 to perform response(s) in formulas that map the higher-order stimuli to those response(s). Similar to ordinary stimuli inferences, if any (direct or indirect) parent hub has subscribed to a higher-order stimulus, then the hub may also percolate the higher-order stimulus inference up the tree hierarchy, in a step-by-step manner to each successive parent hub that has subscribed to the higher-order stimulus, until reaching a hub that stores and processes a formula using the higher-order stimulus.

Advantageously, techniques disclosed herein provide an Internet of Things (IoT) system organized as a tree hierarchy that combines the advantages of the cloud-based PaaS solutions implementing IoT systems and the private IoT systems described above. Formulas are defined at a cloud hub that is a root of the tree hierarchy and percolated down to hubs, including local hubs, that are logically closest to devices specified in the formulas, providing more flexibility than private IoT systems which require local rule engines to be updated manually in order to incorporate new domain knowledge and sensors. Further, in contrast to private IoT systems, the IoT systems according to embodiments disclosed herein are scalable, both vertically by adding more hubs (e.g., at new levels) to a tree hierarchy and horizontally by adding processing nodes to a hub. In addition, by processing formulas at hubs logically closest to devices specified in the formulas rather than always in the cloud as with cloud-based PaaS solutions, network latency issues in sending data to the cloud and receiving instructions back may be avoided, and the IoT system is also resilient to network failure when Internet connectivity to the cloud is lost. Each hub according to embodiments disclosed herein may also be able to handle failures of individual virtual computing instances (or physical machines) by re-assigning data processing to other virtual computing instances (or physical machines) in a cluster, providing fault tolerance at the local cluster level. Privacy is provided by preventing sensor data from being percolated up the tree hierarchy beyond hub(s) where formula(s) requiring the sensor data are stored and processed. In addition, formulas may be defined with basic stimuli and responses, as well as with higher-order stimuli and responses that combine stimuli (with other stimuli and/or raw sensor data) and responses, respectively, which permits users to codify domain-specific knowledge in a form that is understandable by other users and that can be reused to define formulas without having to deal with low-level devices.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method of deploying a hierarchical internet-of-things (IoT) system, comprising:
    retrieving, by each of a plurality of computing systems from a cloud hub of the IoT system, an image of an IoT platform; and
    executing, by each of the plurality of computing systems, a respective local hub of the IoT system comprising one or more virtual machines (VMs) using the image of the IoT platform,
    wherein the cloud hub, the local hubs executed with the plurality of computing systems, and devices that are connected to the cloud hub and to the local hubs are organized in a tree hierarchy which includes the cloud hub as a root node, the local hubs as branch nodes, and the devices as leaf nodes, and
    wherein at least one local hub of the local hubs is configured to process data received from one or more devices connected to the at least one local hub, and wherein the data from the one or more devices that is processed at the at least one local hub of the local hubs is not percolated to other local hubs or the cloud hub that are higher in the tree hierarchy than the at least one local hub.

2. The method of claim 1, wherein:
    the cloud hub is configured to process data from one or more sensor devices and issue commands to one or more actuator devices based, at least in part, on formulas stored at the cloud hub; and each local hub of the local hubs is configured to process data from one or more sensor devices and issue commands to one or more actuator devices based, at least in part, on formulas percolated down the tree hierarchy from the cloud hub and stored at the local hub.

3. The method of claim 2, further comprising:
receiving, at one of the local hubs, a formula that specifies a stimulus and a response to the stimulus, the formula being defined at the cloud hub and percolated down the tree hierarchy to the one of the local hubs;
evaluating, at the one of the local hubs, received data to determine whether the stimulus specified in the formula is satisfied; and
when the stimulus specified in the formula is satisfied, causing one or more of the devices to perform the response specified in the formula.

4. The method of claim 3, wherein the one of the local hubs to which the formula is percolated is a common parent of devices specified in the formula that is logically closest in the tree hierarchy to the devices specified in the formula.

5. The method of claim 3, wherein each of the cloud hub and the local hubs includes a cluster of VMs cooperating to process data and issue commands.

6. The method of claim 5, wherein the cluster of VMs in each of the cloud hub and the local hubs uses a consistent hashing technique to distribute data for processing among VMs of the cluster of VMs, and a conflux technique to combine results of processing by the VMs of the cluster of VMs.

7. The method of claim 1, further comprising, responsive to determining one of the cloud and local hubs does not have enough of at least one of compute, memory, and disk resources to process data generated by a second one or more of the devices connected to the one of the cloud and local hubs, performing at least one of:
adding at least one of a virtual computing instance and hardware resources to the one of the cloud and local hubs; and
adding at least one hub to the IoT system to process at least a portion of the data generated by the second one or more of the devices connected to the one of the cloud and local hubs.

8. The method of claim 1, further comprising:
storing a representation of the tree hierarchy at the cloud hub; and
subsequent to failure of one or more of the local hubs, redeploying the one or more of the local hubs based, at least in part, on the stored representation of the tree hierarchy.

9. The method of claim 1, further comprising:
retrieving, by each of the plurality of computing systems from the cloud hub, an image of a newer version of the IoT platform or an upgraded IoT platform; and
executing, by each of the plurality of computing systems, a respective local hub of the IoT system comprising one or more VMs using the image of the newer version of the IoT platform or the upgraded IoT platform.

10. The method of claim 1, wherein each of the plurality of computing systems includes at least one of a server, a plurality of servers on a rack, and a data center.

11. A non-transitory computer readable medium comprising instructions to be executed in a computer system to carry out a method deploying a hierarchical internet-of-things (IoT) system, the method comprising:
retrieving, by each of a plurality of computing systems from a cloud hub of the IoT system, an image of an IoT platform; and
executing, by each of the plurality of computing systems, a respective local hub of the IoT system comprising one or more virtual machines (VMs) using the image of the IoT platform,
wherein the cloud hub, the local hubs executed with the plurality of computing systems, and devices that are connected to the cloud hub and to the local hubs are organized in a tree hierarchy which includes the cloud hub as a root node, the local hubs as branch nodes, and the devices as leaf nodes, and
wherein at least one local hub of the local hubs is configured to process data received from one or more devices connected to the at least one local hub, and wherein the data from the one or more devices that is processed at the at least one local hub of the local hubs is not percolated to other local hubs or the cloud hub that are higher in the tree hierarchy than the at least one local hub.

12. The non-transitory computer readable medium of claim 11, wherein:
the cloud hub is configured to process data from one or more sensor devices and issue commands to one or more actuator devices based, at least in part, on formulas stored at the cloud hub; and
each local hub of the local hubs is configured to process data from one or more sensor devices and issue commands to one or more actuator devices based, at least in part, on formulas percolated down the tree hierarchy from the cloud hub and stored at the local hub.

13. The non-transitory computer readable medium of claim 12, the method further comprising:
receiving, at one of the local hubs, a formula that specifies a stimulus and a response to the stimulus, the formula being defined at the cloud hub and percolated down the tree hierarchy to the one of the local hubs;
evaluating, at the one of the local hubs, received data to determine whether the stimulus specified in the formula is satisfied; and
when the stimulus specified in the formula is satisfied, causing one or more of the devices to perform the response specified in the formula.

14. The non-transitory computer readable medium of claim 13, wherein the one of the local hubs to which the formula is percolated is a common parent of devices specified in the formula that is logically closest in the tree hierarchy to the devices specified in the formula.

15. The non-transitory computer readable medium of claim 13, wherein each of the cloud hub and the local hubs includes a cluster of VMs cooperating to process data and issue commands.

16. The non-transitory computer readable medium of claim 15, wherein the cluster of VMs in each of the cloud hub and the local hubs uses a consistent hashing technique to distribute data for processing among VMs of the cluster of VMs, and a conflux technique to combine results of processing by the VMs of the cluster of VMs.

17. The non-transitory computer readable medium of claim 11, the method further comprising, responsive to determining one of the cloud and local hubs does not have enough of at least one of compute, memory, and disk resources to process data generated by a second one or more of the devices connected to the one of the cloud and local hubs, performing at least one of:
adding at least one of a virtual computing instance and hardware resources to the one of the cloud and local hubs; and adding at least one hub to the IoT system to process at least a portion of the data generated by the second one or more of the devices connected to the one of the cloud and local hubs.

18. An internet-of-things (IoT) system, comprising:
a plurality of devices;
a cloud hub; and
a plurality of computing systems, each of the computing systems being configured to:
  retrieve an image of an IoT platform from the cloud hub, and
  execute a respective local hub comprising one or more virtual machines (VMs) using the image of the IoT platform,
  wherein the cloud hub, the local hubs, and devices that are connected to the cloud hub and to the local hubs are organized in a tree hierarchy which includes the cloud hub as a root node, the local hubs as branch nodes, and the devices as leaf nodes, and
  wherein at least one local hub of the local hubs is configured to process data received from one or more devices of the plurality of devices connected to the at least one local hub, and wherein the data from the one or more devices that is processed at the at least one local hub of the local hubs is not percolated to other local hubs or the cloud hub that are higher in the tree hierarchy than the at least one local hub.

* * * * *